United States Patent
Kramp et al.

(10) Patent No.: US 7,831,281 B2
(45) Date of Patent: Nov. 9, 2010

(54) INTERFACE

(75) Inventors: Wolfgang Kramp, Ditzingen (DE);
Arndt Wagner, Eberdingen (DE);
Thomas Spichale, Schoenbrunn (DE)

(73) Assignee: Robert Bosch GmbH, Stuttgart (DE)

( * ) Notice: Subject to any disclaimer, the term of this patent is extended or adjusted under 35 U.S.C. 154(b) by 678 days.

(21) Appl. No.: 10/484,368

(22) PCT Filed: Jul. 11, 2002

(86) PCT No.: PCT/DE02/02535

§ 371 (c)(1),
(2), (4) Date: Jun. 15, 2004

(87) PCT Pub. No.: WO03/009145

PCT Pub. Date: Jan. 30, 2003

(65) Prior Publication Data

US 2004/0219881 A1    Nov. 4, 2004

(30) Foreign Application Priority Data

Jul. 18, 2001    (DE)    ................... 101 35 023

(51) Int. Cl.
*H04M 1/00*    (2006.01)
(52) U.S. Cl. .................... 455/569.2; 455/346; 455/550; 455/553.1
(58) Field of Classification Search ................ 455/41.2, 455/557, 73, 550.1, 59.2, 344–346, 507, 455/517, 552.1, 553.1, 556.1, 556.2, 561, 455/569.1, 569.2
See application file for complete search history.

(56) References Cited

U.S. PATENT DOCUMENTS

| | | | | |
|---|---|---|---|---|
| 5,007,050 A | * | 4/1991 | Kasparian et al. | 370/280 |
| 5,420,907 A | * | 5/1995 | Shapiro | 379/38 |
| 6,052,603 A | * | 4/2000 | Kinzalow et al. | 455/557 |
| 6,282,491 B1 | * | 8/2001 | Bochmann et al. | 701/209 |
| 6,397,086 B1 | * | 5/2002 | Chen | 455/569.2 |
| 6,526,287 B1 | * | 2/2003 | Lee | 455/556.1 |
| 6,633,759 B1 | * | 10/2003 | Kobayashi | 455/419 |
| 6,975,857 B2 | * | 12/2005 | Tourrilhes et al. | 455/420 |
| 2001/0031637 A1 | * | 10/2001 | Suzuki | 455/435 |
| 2002/0004402 A1 | * | 1/2002 | Suzuki | 455/456 |
| 2002/0025832 A1 | * | 2/2002 | Durian et al. | 455/556 |
| 2002/0197955 A1 | * | 12/2002 | Witkowski et al. | 455/41 |

FOREIGN PATENT DOCUMENTS

DE    44 32 078    3/1996

(Continued)

OTHER PUBLICATIONS

Nusser et al., "Bluetooth-based wireless connectivity in an automotive environment" Vehicular Technology Conference Fall 2000, Sep. 24-28, 2000, Boston.

*Primary Examiner*—Nhan Le
(74) *Attorney, Agent, or Firm*—Kenyon & Kenyon LLP

(57) ABSTRACT

An interface is for connecting a first electronic component to a network of a plurality of electronic components. The first electronic component is implemented as a telecommunication terminal. A second electronic component connected to the network is implemented as a reproduction or processing device for data of the telecommunication terminal. The interface transmits the data between the reproduction or processing device and the telecommunication terminal.

13 Claims, 2 Drawing Sheets

FOREIGN PATENT DOCUMENTS

| | | |
|---|---|---|
| DE | 196 25 002 | 1/1998 |
| DE | 196 40 735 | 4/1998 |
| DE | 196 51 308 | 7/1998 |
| DE | 198 53 665 | 5/2000 |
| DE | 199 04 544 | 8/2000 |
| DE | 199 14 805 | 10/2000 |
| DE | 199 25 570 | 12/2000 |
| DE | 199 29 331 | 1/2001 |
| DE | 199 50 576 | 5/2001 |
| DE | 199 63 155 | 6/2001 |
| WO | WO 00/72463 | 11/2000 |
| WO | WO 00/72463 A2 * | 11/2000 |
| WO | WO 02/100045 | 12/2002 |

* cited by examiner

INTERFACE

FIELD OF THE INVENTION

The present invention is directed to an interface for connecting electronic components.

BACKGROUND INFORMATION

Interfaces are used for connecting a first electronic component to a network of a plurality of electronic components in a motor vehicle. For example, an air-conditioning system may be connected as an electronic component via a control unit to a vehicle bus, such as a CAN bus, to which further electronic components, such as a keypad or other input unit, may be connected.

SUMMARY

The interface according to the present invention includes a first electronic component implemented as a telecommunication terminal, and a second electronic component connected to the network implemented as a reproduction device or as a processing device for data of the telecommunication terminal. The interface transmits the data between the reproduction or processing device and the telecommunication terminal. In this way, the reproduction or processing device and the telecommunication terminal are connected to the network of the electronic components and may thus communicate with these electronic components. Furthermore, an existing network of electronic components in a motor vehicle may also be used for connecting a reproduction or processing device and a telecommunication terminal and may thus have their functionality expanded. Separate wiring and/or a direct link between the reproduction or processing device and the telecommunication terminal is then not necessary. The integration of the reproduction or processing device and the telecommunication terminal into an existing network of electronic components also only requires a small outlay, particularly if a pre-existing control unit for connecting an electronic component, such as the air-conditioning system and/or the keypad of an input unit in a motor vehicle, is also used for connecting the reproduction or processing device and/or the telecommunication terminal to the network of the electronic components and thus has its functionality enhanced.

An interface module may be provided for wireless connection of the telecommunication terminal. In this way, the expense for cabling between the telecommunication terminal and the network is dispensed with.

According to an example embodiment, the interface includes a controller that controls the exchange of data between the reproduction or processing device and the telecommunication terminal via the interface module. The data exchange between both of the components connected to the network is ensured and a functional unit is formed between the telecommunication terminal and the reproduction or processing device.

In an example embodiment, the interface transmits the data in digital form between the reproduction or processing device and the telecommunication terminal. Digital transmission between the telecommunication terminal and the interface is then supported, so that no analog data transmission is necessary between interface and the reproduction or processing device.

According to an example embodiment, a third electronic component is implemented as an input unit, the input unit is connected to the network, and the interface receives setting and/or selection parameters via the input unit and transmits them to the reproduction or processing device or to the telecommunication terminal. An already existing input unit which is connected to the network may also be used for controlling the telecommunication terminal and/or the reproduction or processing device, so that the functionality of the input unit is enhanced. In addition, it is then no longer necessary to use an input unit of the telecommunication terminal. This may be advantageous for use in a motor vehicle, if the user of the telecommunication terminal and the reproduction or processing device is to be distracted as little as possible from the street traffic, and the input unit connected to the network is located in the front of the vehicle, near the steering wheel.

The controller may be configured to output a query signal to the interface module at predetermined times, such as periodically, in order to check for the presence of the telecommunication terminal. This may allow automatic coupling of the telecommunication terminal to the network via the interface module. This may enhance the operating comfort for the user.

Upon detecting the telecommunication terminal, the controller may be configured to output an initialization signal to the reproduction or processing device and to the interface module for transmission to the telecommunication terminal, in order to transfer the voice input/output functionality to the reproduction or processing device. This may allow the voice input/output functionality to be automatically switched over from the telecommunication terminal to the reproduction or processing device without requiring a user action. This also may enhance the operating comfort for the user.

The controller may be configured to output a deinitialization signal to the reproduction or processing device in order to end the voice input/output functionality of the reproduction or processing device for telecommunication links as soon as the controller detects the absence of the telecommunication terminal upon the query signal. In this way, the voice input/output functionality of the reproduction or processing device is automatically switched off without a user action being necessary.

In addition, an audio device may be connected to the network as a fourth electronic component and the controller may output a muting signal to the audio device if audio signals are exchanged between the reproduction or processing device and the telecommunication terminal via the interface module. The reproduction of audio signals of the audio device may be muted for the duration of a telephone conversation via the telecommunication terminal, so that the user is not distracted from the telephone conversation. The muting is performed automatically in this case without a user action being necessary.

DETAILED DESCRIPTION

Figure 1:
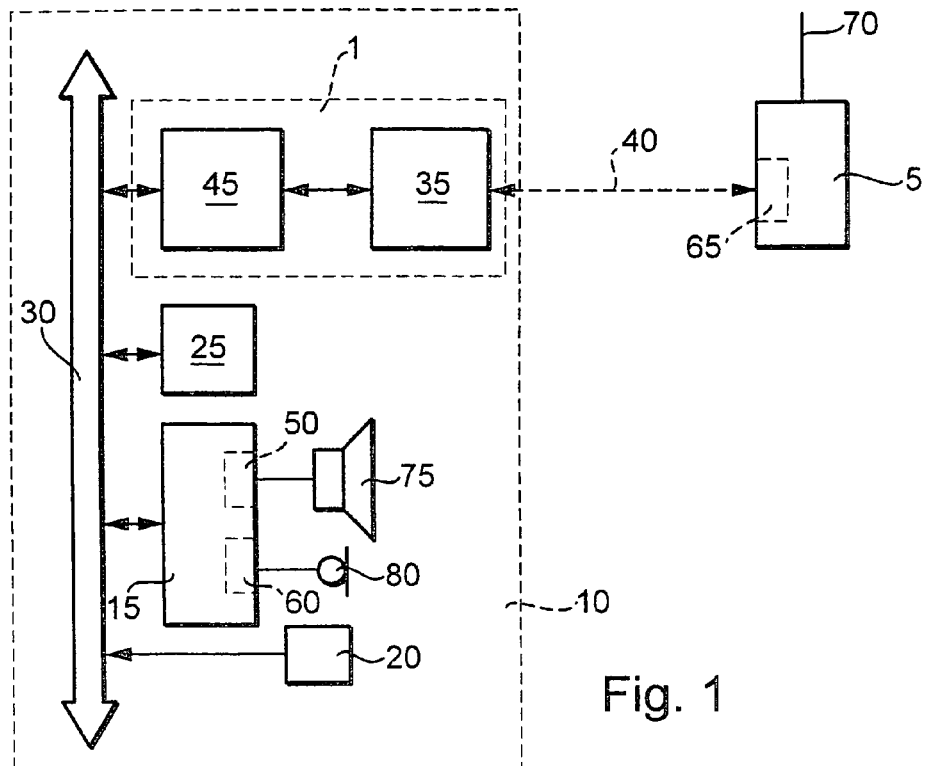
FIG. 1 shows a block diagram of an example embodiment of the interface according to the present invention.

In FIG. 1, there is a network 10 having multiple electronic components 5, 15, 20, 25, which may be positioned in a motor vehicle, for example. In this case, it is therefore assumed for explanatory purposes only that network 10 is a vehicle network. Vehicle network 10 includes a bus device 30, for example a CAN bus, to which electronic components 5, 15, 20, 25 are connected. In this case, a first electrical component 5 is implemented as a telecommunication terminal. A second electronic component 15 is implemented as a reproduction or processing device. Optionally, a third electronic component 20 may be provided, which is implemented as an input unit. In addition, a fourth electronic component 25 may also optionally be provided, which is implemented as an audio device.

Furthermore, further electronic components may be connected to bus device 30, which are not, however, illustrated in the example embodiments shown in the figures. These may include an engine controller, a transmission controller, etc., for example.

In the following example embodiment, reproduction or processing device 15 may be implemented as a hands-free voice device.

As shown in FIG. 1, telecommunication terminal 5 is connected to bus device 30 via an interface 1. In this case, interface 1 includes a controller 45, which is connected to bus device 30 and to an interface module 35 of interface 1. In the example embodiment described here, telecommunication terminal 5 is implemented as a mobile telecommunication terminal and includes a first wireless interface 70 in the form of an antenna for communication with a wireless telecommunication network. Furthermore, telecommunication terminal 5 includes a second wireless interface 65 for wireless communication with interface module 35. A wireless link 40 may be established between interface module 35 and second wireless interface 65 in this manner. This wireless link may be implemented according to the Bluetooth standard, for example. Interface module 35 and second wireless interface 65 form a Bluetooth interface in this case. As shown in FIG. 1, hands-free voice device 15 is connected to bus device 30. A loudspeaker 75 is connected to hands-free voice device 15 via a digital/analog converter 50. A microphone 80 is also connected to hands-free voice device 15 via an analog/digital converter 60. As shown in FIG. 1, input unit 20, which may include a keypad which may be positioned on the cockpit or dashboard, e.g., in direct proximity to the steering wheel, is also connected to bus device 30. Correspondingly, as shown in FIG. 1, audio device 25, which may be a car radio, for example, is also connected to bus device 30. Digital/analog converter 50 and loudspeaker 75 also may be contained in audio device 25 as an alternative. In this case, digital/analog converter 50 and loudspeaker 75 may be dispensed with in hands-free voice device 15.

To connect hands-free voice device 15, input unit 20, and audio device 25 to bus device 30, a control unit may be provided with each and may be integrated in electronic components 15, 20, 25 or distinct from them, allowing communication with the other electronic components connected to bus device 30. Alternatively, hands-free voice device 15, input unit 20, and audio device 25 may be connected jointly, together with interface module 35, to bus device 30 via controller 45, the controller 45 organizing the communication between interface module 35, hands-free voice device 15, input unit 20, and audio device 25 in this case and also allowing communication between electronic components 15, 20, 25, 35 and further electronic components connected to bus device 30 via at least other controller, different from controller 45.

In the event of existing wireless link 40, telecommunication terminal 5 is connected as the first electronic component to controller 45 and thus to bus device 30 and to network 10 via interface module 35. Electronic components 15, 20, 25, 35 are interconnected in this case either by their shared connection to controller 45 or by their connection to bus device 30, and form network 10, which also includes further electronic components.

If hands-free voice device 15 for telecommunication terminal 5 is now used, the audio data received by telecommunication terminal 5 and transmitted by telecommunication terminal 5 is transmitted via wireless link 40. Wireless link 40 may transmit digitally. Controller 45 performs a protocol conversion, such as a pulse code modulation, for example, of the digital audio data of telecommunication terminal 5 received by interface module 35 and transmits the pulse-code modulated audio data either via bus device 30 to hands-free voice device 15, as in FIG. 1, or, if hands-free voice device 15 is connected directly to controller 45, directly to hands-free voice device 15. After a digital/analog conversion in digital/analog converter 50, the audio data is then reproduced by loudspeaker 75. Audio and/or voice data of the user received by microphone 80 is digitized and pulse-code modulated in analog/digital converter 60 and transmitted via bus device 30, as shown in FIG. 1, or, if hands-free voice device 15 is connected directly to controller 45, directly to controller 45. The pulse-code modulated digital audio data is demodulated and/or converted to a serial protocol of interface 1 in controller 45 and output to interface module 35 for transmission to telecommunication terminal 5 via wireless link 40.

In the following, the communication between electronic components 15, 20, 25, 35 illustrated in FIG. 1 via bus device 30 is described, in which communication occurs between these components when they are connected directly to controller 45.

Loudspeaker 75 of hands-free voice device 15 may also be used by audio device 25. In this case, controller 45 may output a muting signal via bus device 30 to audio device 25 if audio signals are exchanged between hands-free voice device 15 and telecommunication terminal 5 via interface module 35. In this way, audio device 25 may be caused to prevent the output of an audio signal for reproduction via loudspeaker 75 of hands-free voice device 15. In this case, the muting signal may be transmitted to audio device 25 only at the beginning of the telecommunication link, for example, in order to prevent the output of the audio signal from audio device 25. As soon as the telecommunication link is ended, controller 45 may output a corresponding muting end signal to audio device 25 via bus device 30, in order to signal to audio device 25 that suppression of the audio signal of audio device 25 is no longer necessary. Alternatively, the muting signal may be output from controller 45 to audio device 25 via bus device 30 during the telecommunication link, audio device 25 suppressing the output of the audio signal as long as it receives the muting signal.

The keypad of input unit 20 may be used for the purpose of inputting setting and/or selection parameters. The setting parameters may, for example, include the input of a short message which is to be transmitted via telecommunication terminal 5 to the wireless telecommunication network. The short message input on the keypad of input unit 20 is relayed via bus device 30 to controller 45 in this case and transmitted from there to telecommunication terminal 5 via interface module 35 and wireless link 40, from where it is relayed to the wireless telecommunication network via first wireless interface 70. Setting parameters may also, however, be parameters for setting the signaling of an incoming call at telecommunication terminal 5, the setting parameters specifying whether the signaling is to be performed via loudspeaker 75 or at telecommunication terminal 5 and how the signaling is to be performed, i.e., using which tune, for example. Any arbitrary further settings for telecommunication links to be established may be input at the keypad of input unit 20 and transmitted via bus device 30 to hands-free voice device 15 or via controller 45 and interface module 35 to telecommunication terminal 5 and cause the desired settings at hands-free voice device 15 or at telecommunication terminal 5. The keypad of input unit 20 may be implemented as an alphanumeric keypad that allows the input of selection parameters, for example, for the input of a telephone number, this telephone number also being transmitted to telecommunication terminal 5 via bus device 30, controller 45, interface module 35, and wireless link 40, so that telecommunication terminal 5 may establish the desired telecommunication link using the dialed telephone number. Controller 45 may output a query signal at predetermined times, periodically, for example, to interface module 35 in order to detect whether interface module 35 is able to receive signals from second wireless interface 65 of telecommunication terminal 5 via wireless link 40. As soon as this occurs, interface module 35 communicates this to controller 45, which subsequently causes hands-free voice device 15 to take over the voice input/output functionality for telecommunication terminal 5 via bus device 30 using an initialization signal. In addition, controller 45 transmits a signal via interface module 35 and wireless link 40 to telecommunication terminal 5 in order to interrupt its voice input/output functionality. In this way, telecommunication terminal 5 is automatically interfaced with hands-free voice device 15, which takes over the voice input/output functionality of telecommunication terminal 5. Telecommunication terminal 5 is thus connected to network 10. A further initialization signal is transmitted from controller 45 to input unit 20, so that a voice link or the transmission of a short message may be initiated from input unit 20.

A voice link may, however, also be established if a call is received at telecommunication terminal 5. This is communicated via wireless link 40 and interface module 35 to controller 45, which, for example, causes signaling through loudspeaker 75 of hands-free voice device 15. In this case, due to the suppression of the voice input/output functionality of telecommunication terminal 5, the signaling there may also be suppressed. The incoming call may be accepted by appropriate key operation at input unit 20 and is output via bus device 30, controller 45, and interface module 35, using wireless link 40, to telecommunication terminal 5 for relay to the wireless telecommunication network. The voice link may now take place as described via wireless link 40 and hands-free voice device 15.

Furthermore, controller 45 may output the query signal to interface module 35 at the predetermined times, periodically, for example, in order to check whether interface module 35 is still receiving wireless signals from telecommunication terminal 5. This query is performed independently of whether or not a telecommunication link has been established.

Second wireless interface 65 of telecommunication terminal 5 emits control information, which may be received within the range of second wireless interface 65, at predetermined times, periodically, for example. Interface module 35 checks in this case whether it has received such control information and, in the event of receiving such control information, detects the presence of telecommunication terminal 5, which it communicates to controller 45 upon its query signal. As soon as interface module 35 receives the control information of telecommunication terminal 5, it in turn transmits a wireless acknowledgment signal to telecommunication terminal 5, which is received by the terminal via second wireless interface 65 and communicated to telecommunication terminal 5 that wireless link 40 may be established between second wireless interface 65 and interface module 35. As soon as telecommunication terminal 5 no longer receives wireless acknowledgment signals from interface module 35 via second wireless interface 65, it switches its voice input/output functionality back on and is usable as a complete telecommunication terminal 5. There are two possible reasons for not receiving the acknowledgment signals of interface module 35 in second wireless interface 65 of telecommunication terminal 5: first, it may be that if telecommunication terminal 5 is distant from interface module 35, interface module 35 no longer receives the control information of telecommunication terminal 5, and therefore also no longer transmits wireless acknowledgment signals to telecommunication terminal 5; second, it may be that the range of telecommunication terminal 5 is greater than the range of interface module 35, i.e., interface module 35 still receives the control information of telecommunication terminal 5 and generates corresponding wireless acknowledgment signals and transmits them back to telecommunication terminal 5, but the wireless acknowledgment signals are no longer received by telecommunication terminal 5. In both cases, wireless link 40 is no longer maintained and telecommunication terminal 5 receives its full voice input/output functionality again and is usable independently of hands-free voice device 15. Telecommunication terminal 5 is then too far from interface module 35 for the wireless link 40 to be implemented. This is the case, for example, if the user at telecommunication terminal 5 leaves his vehicle and takes telecommunication terminal 5 with him.

If interface module 35 no longer receives control information from telecommunication terminal 5, it communicates this in a response to a corresponding query signal of controller 45, which subsequently outputs a deinitialization signal to hands-free voice device 15 via bus device 30, in order to end the voice input/output functionality of hands-free voice device 15 for telecommunication links. Correspondingly, controller 45 transmits a deinitialization signal to input unit 20 via bus device 30, in order to end the functionality of input unit 20 for inputting the setting and/or selection parameters.

Figure 2:
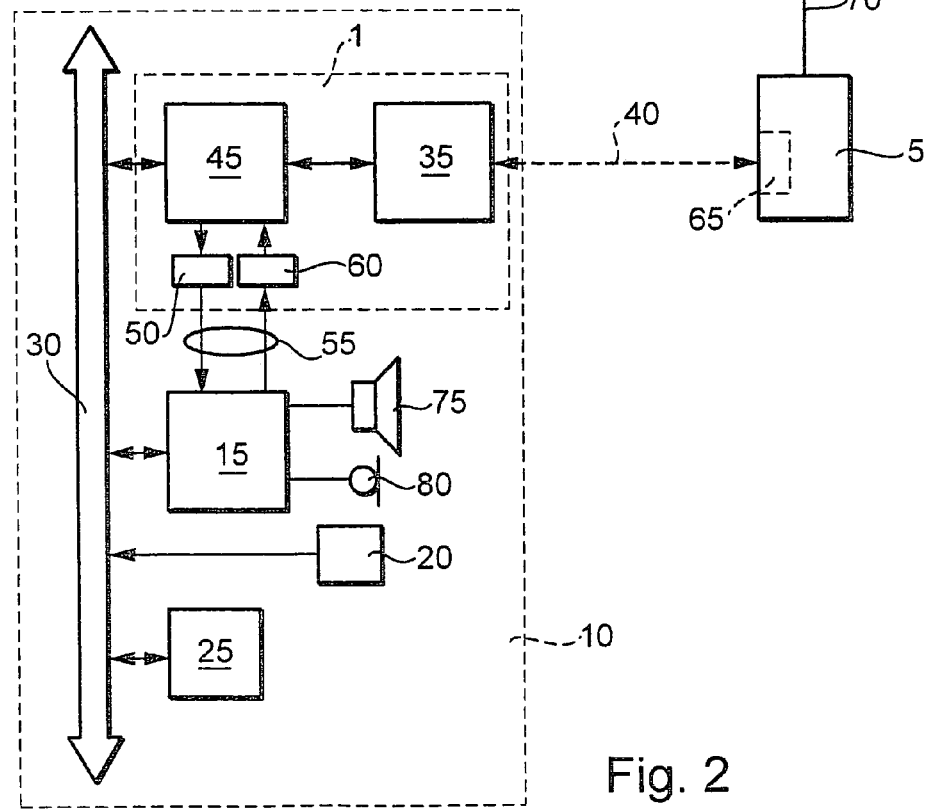
FIG. 2 shows a block diagram of an example embodiment of the interface according to the present invention.

A second example embodiment of the present invention is illustrated in FIG. 2, in which identical reference numbers identify identical elements as in FIG. 1. As shown in FIG. 1, the second example embodiment differs from the first example embodiment in that a separate line 55 is provided for transmitting analog audio data between hands-free voice device 15 and controller 45. For this purpose, controller 45 is connected to hands-free voice device 15 via digital/analog converter 50 and via analog/digital converter 60. In the second example embodiment, the digital audio data received from telecommunication terminal 5 in controller 45 is converted by digital/analog converter 50 into analog audio data and output via line 55 to hands-free voice device 15 for reproduction at loudspeaker 75. Correspondingly, the analog audio data received by microphone 80 is transmitted via line 55 to analog/digital converter 60, converted there into digital audio data and relayed to controller 45, from where it is output to telecommunication terminal 5 via interface module 35. As in the first example embodiment, in the second example embodiment the digital audio data received in telecommunication terminal 5 from interface module 35 is transmitted via first wireless interface 70 to the wireless telecommunication network. Conversely, the digital audio data received from the wireless telecommunication network in telecommunication terminal 5 via first wireless interface 70 is transmitted via second wireless interface 65, wireless link 40, and interface module 35 to controller 45.

Line 55 may be implemented with two wires for the different transmission directions, as illustrated in FIG. 2. Control data such as the initialization signals is then transmitted via bus device 30, while the audio signals are transmitted via line 55.

Conversely, interface module 35, rather than telecommunication terminal 5, may emit the control information in the form of query information at predetermined times, periodically, for example, for the detection of a telecommunication terminal 5 located near interface module 35, and telecommunication terminal 5 may emit a corresponding wireless acknowledgment signal each time it receives this query information via second wireless interface 65, which is received in turn by interface module 35. If interface module 35 receives such a wireless acknowledgement signal, it communicates to controller 45 on the corresponding query signal that a wireless link 40 may be established to telecommunication terminal 5. The initialization procedure described is subsequently performed, in which the voice input/output functionality is transferred from telecommunication terminal 5 to hands-free voice device 15. If telecommunication terminal 5 is too far from interface module 35 to receive the query information via second wireless interface 65, then a wireless acknowledgment signal is also no longer emitted by telecommunication terminal 5. Interface module 35 then does not receive such a wireless acknowledgment signal and communicates to controller 45 on the corresponding query signal so that it is then not possible to establish a wireless link 40 to telecommunication terminal 5. Subsequently, controller 45 initiates the deinitialization procedure described, in which the voice input/output functionality is ended for telecommunication links at hands-free voice device 15. Correspondingly, the voice input/output functionality of telecommunication terminal 5 is automatically reactivated by this terminal if no further query information is received from interface module 35 in telecommunication terminal 5 within a predetermined period of time from the last query information received.

If an existing telecommunication link to the wireless telecommunication network using wireless link 40 is ended by input at input unit 20, corresponding end control information is transmitted from input unit 20 via bus device 30 to controller 45, which subsequently communicates to hands-free voice device 15 via bus device 30 and to telecommunication terminal 5 via interface module 35 and wireless link 40 that the existing telecommunication link is to be ended, The telecommunication terminal 5 then initiates the termination of the telecommunication link to the wireless telecommunication network. In addition, controller 45 transmits a corresponding control signal via bus device 30 to audio device 25, in order to end the muting of audio device 25. Alternatively, a transmission of the muting signal from controller 45 via bus device 30 to audio device 25 that is performed continuously during the telecommunication link may be ended. If the conversation is ended from the wireless telecommunication network, then a corresponding status report occurs from telecommunication terminal 5 via wireless link 40 and interface module 35 to controller 45, which relays this information to the voice device 15 via bus device 30 and also ends the muting of audio device 25 in the manner described above.

Figure 3:
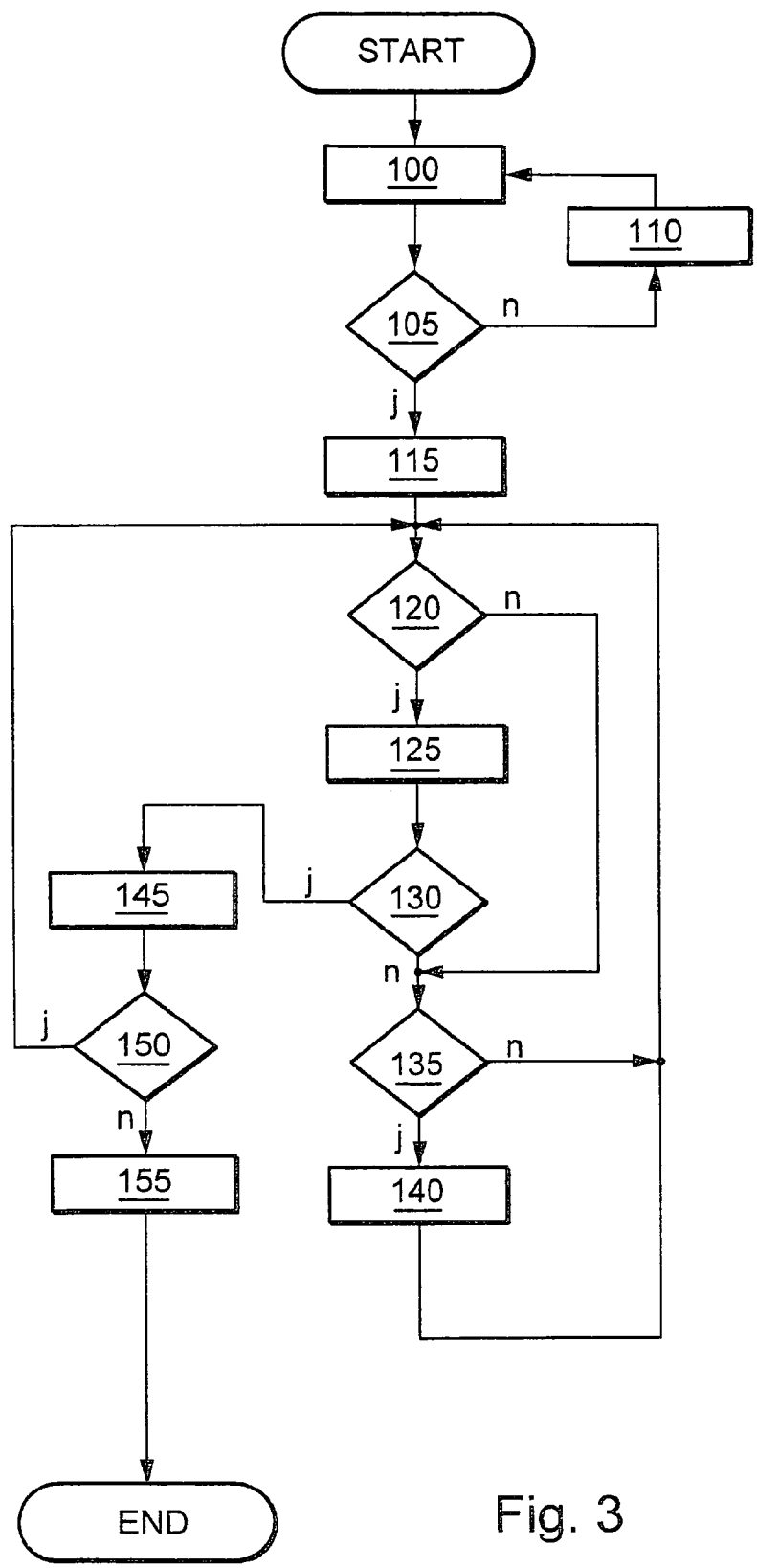
FIG. 3 shows a flowchart of an example mode of operation of a controller of the interface according to an example embodiment of the present invention.

In the following, the mode of operation of controller 45 is explained on the basis of a flowchart with reference to FIG. 3. At program point 100, controller 45 transmits a query signal to interface module 35 in order to check whether wireless link 40 to telecommunication terminal 5 may be established. Subsequently, the sequence branches to a program point 105. At program point 105, controller 45 checks whether interface module 35 has communicated, in response to the query signal, that wireless link 40 to telecommunication terminal 5 may be established. If this is the case, the sequence branches to a program point 115; otherwise the sequence branches to a program point 110. At program point 110, a predetermined waiting time elapses. Subsequently, the sequence branches back to program point 100. The initialization described, in which the voice input/output functionality is switched off at telecommunication terminal 5 upon the command of controller 45 and is transferred to hands-free voice device 15, is performed at program point 115. Furthermore, controller 45 also causes the initialization of input unit 20 as described above, in order to be able to operate telecommunication terminal 5 via input unit 20. Subsequently, the sequence branches to a program point 120. At program point 120, controller 45 checks whether a telecommunication link to the wireless telecommunication network via telecommunication terminal 5 is to be established or is still in progress. If this is the case, the sequence branches to a program point 125; otherwise the sequence branches to a program point 135. At program point 125, controller 45 informs both telecommunication terminal 5 and hands-free voice device 15 about the planned establishment of a link if it originates from input unit 20 as described above, and solely hands-free voice device 15 if the planned link establishment is initiated from the wireless telecommunication network. Furthermore, controller 45 causes the muting of audio device 25. Subsequently, the sequence branches to a program point 130 at which controller 45 checks whether the telecommunication link was ended from input unit 20 or from the wireless telecommunication network. If this is the case, the sequence branches to a program point 145; otherwise it branches to a program point 135. At program point 135, controller 45 checks whether setting and/or selection parameters were input at input unit 20. If this is the case, the sequence branches to a program point 140; otherwise it branches back to program point 120. At program point 140, the setting and/or selection parameters received by controller 45 via bus device 30 are analyzed, the selection parameters, which may include a telephone number to be dialed, being transmitted via wireless link 40 to telecommunication terminal 5 with the request to establish a link to the corresponding telephone number and the setting parameters being transmitted from controller 45 to telecommunication terminal 5 or to hands-free voice device 15, depending on whether the setting is to be performed at telecommunication terminal 5 or at hands-free voice device 15. If the setting parameters are a request input by the user at input unit 20 to cancel existing muting, controller 45 causes audio device 25 to cancel the muting in the way described via bus device 30. Subsequently, the sequence branches back to program point 120. At program point 145, controller 45 communicates to hands-free voice device 15 that the telecommunication link is currently ended. If the telecommunication link is ended at input unit 20, controller 45 also informs telecommunication terminal 5 via wireless link 40 that the telecommunication link has been ended. Furthermore, controller 45 causes the cancellation of the muting of audio device 25 as described above.

Subsequently, the sequence branches to a program point 150 at which controller 45 checks whether interface module 35 is still detecting telecommunication terminal 5 as present on the basis of the analysis of the query signal. If this is the case, the sequence branches back to program point 120; otherwise it branches to a program point 155. At program point 155, controller 45 causes deinitialization using the deinitialization signals transmitted via bus device 30 to hands-free voice device 15 and input unit 20.

The conversation end at program point 130 may also be detected by controller 45 in that, in response to a query signal, interface module 35 informs controller 45 that telecommunication terminal 5 is absent, i.e., wireless link 40 is terminated. After program point 155, the program is exited.

During a telecommunication link, telecommunication terminal 5 remains active as a wireless transceiver unit for connection to the wireless telecommunication network. This network may be a GSM network (global system for mobile communications), a UMTS network (universal mobile telecommunication system), for example. Wireless link 40 may be operated in a different frequency range than the wireless link between telecommunication terminal 5 and the wireless telecommunication network, so that no mutual interference occurs. This is ensured if the Bluetooth standard is used for wireless link 40 and a GSM or a UMTS wireless link is used between telecommunication terminal 5 and the wireless telecommunication network.

The connection between controller 45 and interface module 35 may be produced via a serial interface.

Furthermore, additionally or alternatively, a further reproduction device, a display device, may be provided as a fifth electronic component and may be connected to bus device 30 or directly to controller 45. The display device may also be initialized and/or deinitialized by controller 45 for displaying telecommunication-relevant data, such as text or graphic data of a text or graphic message, as was described for input unit 20, for example. Then, for example, text data received in interface module 35 via wireless link 40 from telecommunication terminal 5, SMS (short message service) messages, for example, if the GSM standard is used, or graphic data, may be reproduced on the display device.

In addition, a navigation system may be connected as a processing device to bus device 30 or directly to controller 45 as the sixth electronic component to process traffic information received by interface module 35 from the wireless telecommunication network via telecommunication terminal 5 and wireless link 40. The navigation system may also be initialized and deinitialized by controller 45 in the manner described for input unit 20 to receive such information. It is then possible to reproduce or display navigation information for routing, for example, via the display device.

The text or graphics data and/or the traffic information is relayed from controller 45 via bus device 30 and/or directly to the display device and/or the navigation system for display and/or processing. The display device and/or the navigation system are also initialized in this case, i.e., set for receiving and processing corresponding data at telecommunication terminal 5, as long as telecommunication terminal 5 is detected as present by interface module 35. Due to wireless link 40, telecommunication terminal 5 no longer needs to be operated by the user for a telecommunication link and may therefore remain in a pocket of the user, for example. Cabling between hands-free voice device 15 and telecommunication terminal 5 is not necessary or simply uses a cable for supplying a battery charging voltage. The transmission of all the data, i.e., audio data and control data, between the individual electronic components via bus device 30 or directly via controller 45 may be performed digitally, with the exception of the analog transmission of the audio data between interface 1 and hands-free voice device 15 described in FIG. 2. Wireless link 40 is in a frequency range at approximately 2.4 GHz if the Bluetooth standard is used. The setting and/or selection parameters input at the keypad of input unit 20 are transmitted by input unit 20 in digital form to bus device 30 or directly to controller 45. Telecommunication terminal 5 may be implemented as a wireless device, as a mobile telephone, as an organizer, as a personal digital assistant (PDA), as a personal computer (PC), or as a notebook with an appropriate wireless interface to the wireless telecommunication network.

Alternatively, telecommunication terminal 5 may not include a wireless interface to the wireless telecommunication network and the communication may be performed with the electronic components of network 10 via wireless link 40 and interface 1. In this case as well, the data exchanged via wireless link 40 may be audio data, text data, graphic data, or control information. In this case, telecommunication terminal 5 may be implemented as an organizer, as a personal digital assistant (PDA), as a personal computer (PC), or as a notebook, but without a wireless interface to the wireless telecommunication network.

What is claimed is:

1. An interface configured to connect a telecommunication terminal to a vehicle network having a plurality of electronic components, the plurality of electronic components including an audio device connected to the network and at least one of a reproduction device and a processing device, the at least one of a reproduction and a processing device being separate from the audio device, the interface comprising:

an arrangement configured to transmit data between the at least one of a reproduction and a processing device and the telecommunication terminal; and a controller configured to control exchange of data between the at least one of a reproduction and a processing device and the telecommunication terminal, and to arbitrate access to the at least one of a reproduction and a processing device by assigning access to the telecommunication terminal when access is simultaneously requested by the telecommunication terminal and the audio device, wherein the plurality of electronic components includes an input unit connected to the vehicle network, the interface configured to receive at least one of setting and selection parameters input via the input unit and to transmit the at least one of setting and selection parameters to one of the at least one of a reproduction and a processing device and the telecommunication terminal, and wherein the interface is further configured to receive graphic data from the telecommunication terminal, and to reproduce the graphic data on a display device.

2. The interface as recited in claim 1, further comprising: an interface module configured to provide a wireless link to the telecommunication terminal.

3. The interface as recited in claim 2, wherein the wireless link between the telecommunication terminal and the interface module includes a Bluetooth link.

4. The interface as recited in claim 2, wherein the controller is configured to control exchange of data between the at least one of a reproduction and a processing device and the telecommunication terminal via the interface module.

5. The interface as recited in claim 4, wherein the controller is configured to output a query signal to the interface module at predetermined times to check for presence of the telecommunication terminal.

6. The interface as recited in claim 5, wherein the controller is configured to output the query signal to the interface module periodically.

7. The interface as recited in claim 5, wherein the controller is configured to output an initialization signal to the at least one of a reproduction and a processing device and to the interface module for transmission to the telecommunication terminal upon detection of the telecommunication terminal to enable transfer of voice input/output functionality to the at least one of a reproduction and a processing device.

8. The interface as recited in claim 7, wherein the controller is configured to output a deinitialization signal to the at least one of a reproduction and a processing device to deactivate the voice input/output functionality of the at least one of a reproduction and a processing device for telecommunication links as soon as the controller detects absence of the telecommunication terminal in response to the query signal.

9. The interface as recited in claim 4, wherein the controller is configured to perform the assigning by outputting a muting signal to the audio device when audio signals are exchanged between the at least one of a reproduction and a processing device and the telecommunication terminal via the interface module.

10. The interface as recited in claim 2, further comprising:
a digital/analog converter configured to convert digital audio data received from the interface module into analog audio data; and
a line;
wherein the at least one of a reproduction and a processing device includes a hands-free voice device, the line arranged between the interface and the hands-free voice device, the line configured to transmit the analog audio data between the hands-free voice device and the interface.

11. The interface as recited in claim 2, further comprising:
an analog/digital converter;
wherein the at least one of a reproduction and a processing device includes a hands-free voice device and the analog/digital converter is configured to convert analog audio data received from the hands-free voice device into digital audio data.

12. The interface as recited in claim 1, wherein the arrangement configured to transmit data is configured to transmit data in digital form between the at least one of a reproduction and a processing device and the telecommunication terminal.

13. The interface as recited in claim 12, wherein the arrangement configured to transmit data is configured to transmit data modulated in accordance with a pulse code modulation method.

* * * * *